United States Patent [19]
Rossi

[11] Patent Number: 5,276,711
[45] Date of Patent: Jan. 4, 1994

[54] RECEIVER FOR A DATA SIGNAL WHICH INCLUDES DATA SYMBOLS OCCURRING AT A GIVEN BAUD RATE

[75] Inventor: Roberto R. Rossi, Eindhoven, Netherlands

[73] Assignee: U.S. Philips Corporation, New York, N.Y.

[21] Appl. No.: 715,198

[22] Filed: Jun. 14, 1991

[30] Foreign Application Priority Data

Jul. 11, 1990 [NL] Netherlands ............... 9001576

[51] Int. Cl.⁵ .......................................... H04L 7/027
[52] U.S. Cl. .................................... 375/106; 375/101
[58] Field of Search .................. 375/14, 94, 95, 101, 375/106, 108, 118, 119, 120; 455/296; 328/63, 72

[56] References Cited

U.S. PATENT DOCUMENTS

| | | |
|---|---|---|
| 4,615,038 | 9/1986 | Lim et al. ........................... 375/14 |
| 4,896,334 | 1/1990 | Sayar ................................. 375/118 |
| 4,905,254 | 2/1990 | Bergmans .......................... 375/94 |
| 4,959,845 | 9/1990 | Tol et al. ............................ 375/106 |

Primary Examiner—Stephen Chin
Assistant Examiner—Young Tse
Attorney, Agent, or Firm—Leroy Eason

[57] ABSTRACT

A receiver for receiving data signals which include data symbols $C(k)$ having a symbol Baud rate. A local oscillator generates a local Baud rate clock for sampling a received signal, a symbol detector recovers the symbols $C(k)$ from the signal samples, and an arithmetic processor circuit derives for each sample an error signal $e(k)$ which is a measure of the phase difference between the local Baud rate clock and the symbol Baud rate clock of the received signal. A reference circuit generates a reference signal $V_r(k)$ which is proportional to the amplitude of the received symbols. The receiver further includes a control circuit (11) for forming from the signals $C(k)$, $e(k)$ and $V_r(k)$ a pair of control signals $\Delta F$ and $\Delta \phi$ which adjust the frequency and phase of the clock oscillator so as to reduce the aforesaid phase difference. In order to avoid phase and frequency oscillations due to such adjustment, the frequency of the clock oscillator is maintained unchanged when the absolute value of the clock phase difference is decreasing, or is changed so as to slow down such decrease.

11 Claims, 4 Drawing Sheets

RECEIVER FOR A DATA SIGNAL WHICH INCLUDES DATA SYMBOLS OCCURRING AT A GIVEN BAUD RATE

BACKGROUND OF THE INVENTION

1. Field of the Invention

The invention relates to a receiver for use in a system for transmitting data symbols at a given Baud rate, the receiver comprising a clock oscillator which has a control input for controlling the phase and frequency of a locally generated Baud rate clock signal, and means for deriving an error signal which is a measure of the phase difference between a Baud rate clock signal belonging to the received data symbols and the Baud rate clock signal generated locally by the clock oscillator.

A receiver of this type is known from Dutch Patent Application No. 8800490 which corresponds to U.S. Pat. No. 4,959,845, issued Sep. 25, 1990 laid open to public inspection.

2. Description of the Related Art

In such prior-art receiver the received data signal is sampled by the locally generated Baud rate clock signal, whose frequency is equal to that of the symbol rate of the transmitted data symbols, so as to make decisions on the logic value of the output symbols at the symbol rate.

In order to obtain a correct symbol decision, it is desirable that the magnitude of the phase difference between the Baud rate clock signal belonging to the received data symbols and the locally generated Baud rate clock signal remain below a specific value. This is realised in the prior-art receiver by measuring the phase difference between the clock signals and adapting the phase of the locally generated Baud rate clock signal in a step-by-step fashion on the basis of the result of this measurement, so as to reduce the phase difference between the clock signals. For that purpose, such receiver comprises a phase control circuit.

The prior-art measurement of the phase difference between the clock signals is based on the experience that the shape of the leading edge of a received data symbol, also termed the precursor, is virtually only dependent on the filters in the transmitter and the receiver and virtually independent of the properties of the transmission line in between.

As described in above-mentioned patent, an error signal is obtained which is a measure of the phase difference between the clock signals, by subtracting a given fraction of the present value of the received signal from the value thereof at the previous sampling instant. This is possible because the nominal sampling error signal which is not dependent on the phase difference between the clock signals, but is dependent for example, on echos and/or intersymbol interference, is sufficiently low.

In full-duplex two-wire transmission the received data signal may be disturbed by echos from symbols simultaneously transmitted by the receiving station. A first type in echo may develop as a result of crosstalk of the so-called hybrid circuit, as a result of which although the transmitted symbols which end up in the receiver are weaker, admittedly, they are still stronger than the received signal. A second type of echo may develop because the transmission line at the far end is not terminated with a perfectly matched load, as a result of which the transmitted symbols are partly reflected at the far end of the transmission line and thus return to the receiver through the transmission line. By reproducing these echo signals by means of an adaptive echo canceller on the basis of the transmitted symbols and the error signal as well, and by subtracting the reproduced echos from the received data signal, the disturbance of the received data signal as a result of echos may be reduced considerably.

Another possible source of the disturbance of the received data signal is formed by intersymbol interference, which develops from the transmission properties of the transmission line, as a result of which the values of the signals received at previous sampling instants still affect the value of the received data signal at the present sampling instant. This source of disturbance may be reduced by reproducing the intersymbol interference by means of an adaptive decision feedback intersymbol interference canceller, and subtracting from the received data signal the intersymbol interference thus reproduced.

A relatively small phase step of the locally generated Baud rate clock signal may lead to a misadaptation of the adaptive echo canceller or the adaptive decision feedback intersymbol interference canceller, which may result in a greater probability of incorrect symbol detection. Thus, it is desirable that no phase steps be made after the capturing of the phase control circuit. This is achieved by switching the phase control circuit off when the magnitude of the phase difference between the clock signals becomes smaller than a specific value.

In order to be able to track slow variations in frequency and phase of the received signal, the prior-art clock oscillator is phase-controllable in addition to being frequency-controllable. For this purpose, the error signal is applied to a polarity detector whose output is connected to the control input of the clock oscillator. Consequently, the frequency of the clock oscillator will be increased in one state of the polarity detector and decreased in the other state of the polarity detector.

As long as the locally generated Baud rate clock signal is lagging the Baud rate clock signal associated with the data symbols, the frequency of the prior art local clock oscillator will be increased in small steps. If the locally generated Baud rate clock signal is leading the Baud rate clock signal associated to the data symbols, the frequency of the clock oscillator will be decreased in small steps.

A problem with this type of frequency control is the development of frequency and phase oscillations around the desired frequency and phase. These oscillations may have such an amplitude that the phase control circuit is re-activated and produces phase steps in the locally generated Baud rate clock signal.

SUMMARY OF THE INVENTION

It is an object of the invention to provide a receiver as set forth in the preamble in which the amplitude of the phase and frequency oscillations due to control of the clock oscillator is considerably reduced as compared to prior-art receivers.

For this purpose, the receiver is characterised in that it comprises means for determining the absolute value (voltage level) of the error signal at different sampling instants; comparator means for determining the difference between two successive such sample values; and means for forming a control signal from the sample value difference and the sign of the error signal, which control signal is applied to the control input of the clock oscillator in order to reduce the phase difference between the clock signals.

The invention is based on the insight that said undesired frequency and phase oscillations originate from the fact that in the prior-art receiver the frequency of the clock oscillator continues to be increased or decreased, respectively, even after the phase difference between the clock signals has already started to decrease or increase, respectively. Thus, there is always an overadjustment of the frequency. In order to avoid these oscillations, according to the invention, the frequency is no longer adapted in the same direction as it was initially adapted when the magnitude of the phase difference between the clock signals was still increasing, once the magnitude of such phase difference starts to decrease.

According to a preferred embodiment, the receiver is characterised in that the error signal is derived from the mean value of the phase difference between the clock signals over a number of successive symbol intervals.

This method is advantageous in that the influence on the error signal of occasional input signal interference caused by noise is reduced.

There are various possibilities of frequency adaptation to avoid that the frequency of the clock oscillator continues to be increased or reduced after the frequency of the clock oscillator is already too high or too low, respectively.

In a first embodiment of the frequency adaptation according to the invention the receiver is characterised in that the frequency of the clock oscillator is allowed to remain unchanged if the sample value difference is negative, because this denotes that the magnitude of the clock value difference is decreasing and so correction is not necessary. However, a negative sample value difference, which is directly caused by a magnitude of the phase difference between the clock signals is also caused by a frequency difference between the clock signals. In that case, therefore, if no frequency correction is made, the absolute value of the phase difference between the clock signals will become zero after a certain amount of time and then, start to increase again.

In order to postpone the moment at which the magnitude of the phase difference between the clock signals starts to increase again, in a second embodiment of the invention the receiver is characterised in that the frequency of the clock oscillator is reduced if the sample value difference is negative and also the locally generated Baud rate clock signal is lagging the Baud rate clock signal associated with the data symbols. The frequency of the clock oscillator is increased if the sample value difference is negative and also the locally generated Baud rate clock signal is leading the Baud rate clock signal associated with the data symbols.

Such measures to postpone the moment at which the clock phase difference starts to increase again are based on the insight that reduction of the sample value difference is slowed down by reducing the magnitude of the frequency difference between the locally generated Baud rate clock signal and the Baud rate clock signal associated with the data symbols.

When the magnitude of the clock phase difference is decreasing and also the locally generated Baud rate clock signal is lagging the clock signal associated with the data symbols, that means that the frequency of the clock oscillator is higher than the frequency of the clock signal associated with the data symbols. A reduction of the clock oscillator frequency will cause the sample value difference to reduce less rapidly than when the frequency of the clock oscillator remains unchanged. When the locally generated Baud rate clock signal is leading the clock signal associated with the data symbols, the frequency of the clock oscillator will have to be increased to cause the sample value difference to reduce less rapidly.

According to a third embodiment of the invention, in order to slow down the reduction of the sample value difference only in the cases when this reduction exceeds a specific value, the receiver is characterised in that the frequency of the clock oscillator is allowed to remain unchanged if the sample value difference is negative and also the present sample value is larger than a predetermined fraction of the previous sample value. The frequency of the clock oscillator is reduced if the sample value difference is negative and, in addition, the sample value is smaller than a predetermined fraction of the previous sample value and also the locally generated Baud rate clock signal is lagging the Baud rate clock signal associated with the data symbols. The frequency of the clock oscillator is increased if the sample value difference is negative and, in addition, the sample value is smaller than a predetermined fraction of the previous sample value and also the locally generated Baud rate clock signal is leading the Baud rate clock signal associated with the data symbols.

Owing to these measures the reduction of the sample value difference is determined and compared to a predetermined value. If the reduction of the sample value difference is smaller than the predetermined value, the reduction of the sample value difference is not slowed down and thus the frequency of the clock oscillator is not changed. However, if this reduction is larger than the predetermined value, the reduction of the sample value difference is slowed down by an appropriate adaptation of the clock oscillator frequency.

In order to reduce the clock phase difference in case of a positive sample value difference, the receiver is characterised in that the frequency of the clock oscillator is increased if the sample value difference is positive and also the locally generated Baud rate clock signal is lagging the Baud rate clock signal associated with the data symbols and, in addition, the sample value is greater than a predetermined value. The frequency of the clock oscillator is reduced if the sample value difference is positive and also the locally generated Baud rate clock signal is leading the Baud rate clock signal associated with the data symbols and, in addition, the sample value is greater than a predetermined value. The frequency of the clock oscillator is allowed to remain unchanged if the sample value difference is positive and also smaller than a predetermined value.

The sample value difference is positive if the magnitude of the clock phase difference is increasing; a frequency correction is then necessary. The frequency of the clock oscillator is then increased or reduced as a function of the sign of the phase difference between the clock signals so as to reduce this clock phase difference.

In the foregoing, values of successive samples have always been discussed. However, it is conceivable that between said successive sample values one or more other samples may be present.

BRIEF DESCRIPTION OF THE DRAWINGS

The invention will now be further explained with reference to the Figures, in which like elements are denoted by like reference characters.

DESCRIPTION OF THE PREFERRED EMBODIMENTS

Figure 1:
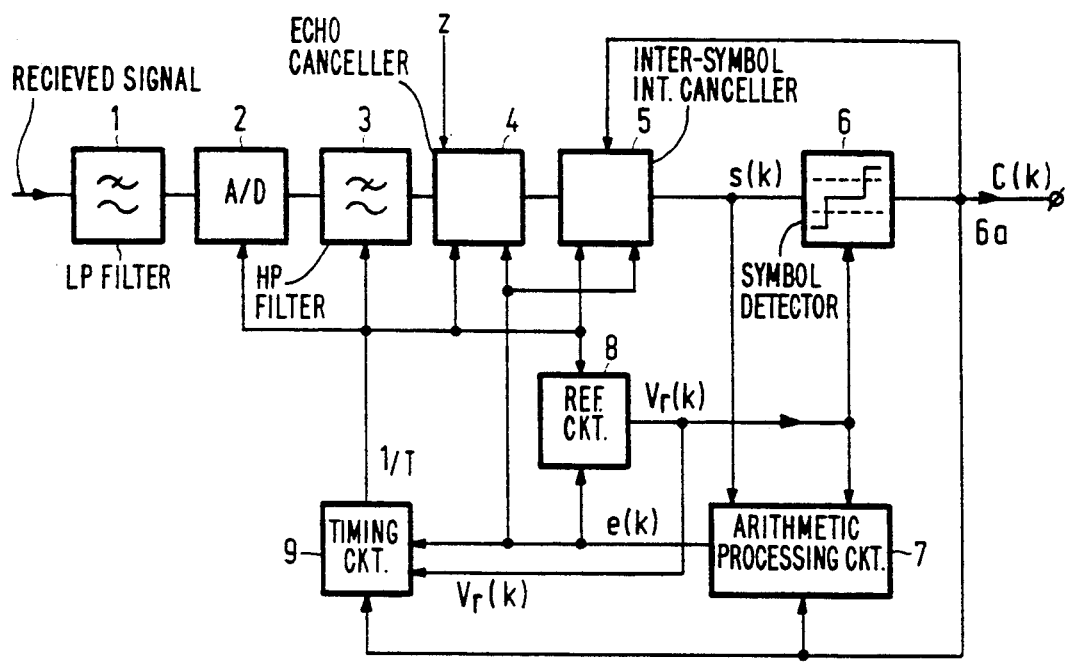
FIG. 1 shows a block diagram of a receiver for use in a data transmission system according to the invention.

The operation of the receiver will now be explained with reference to the drawing Figures. In FIG. 1 the received signal is applied to the input of a low-pass filter 1. The output of the low-pass filter 1 is connected to the input of an analog-to-digital converter 2. The output of the analog-to-digital converter 2 is connected to the input of a high-pass filter 3. The output of the high-pass filter 3 is connected to the input of an echo canceller 4. This echo canceller 4 also receives a locally transmitted signal z. The output of the echo canceller 4 is connected to the input of a decision feedback intersymbol interference canceller 5. The output of the intersymbol interference canceller 5 having the output signal s(k) is connected to the input of a symbol detector 6 and an input of an arithmetic processing circuit 7. At the output of the symbol detector 6 the received data symbol C(k) is available. Output 6a, having the output signal C(k) of the symbol detector 6, is connected to the symbol input of the intersymbol interference canceller 5, an input of the arithmetic circuit 7 and an input of a timing circuit 9. The output of the arithmetic circuit 7 is connected to the error signal input of a reference circuit 8, the error signal input of the echo canceller 4, the error signal input of the decision feedback intersymbol interference canceller 5 and the error signal input of the timing circuit 9. The output signal $V_r(k)$ of the reference circuit 8 is applied to the reference input of the symbol detector 6, an input of the arithmetic circuit 7 and an input of the timing circuit 9. The output of the timing circuit 9, having the output signal 1/t, is connected to the clock inputs of the analog-to-digital converter 2, the high-pass filter 3, the echo canceller 4, the intersymbol interference canceller 5 and the reference circuit 8.

In FIG. 1 the received signal is filtered by the low-pass filter 1. This filter has for its object to fix the slope of the leading edge of the received data symbols at a value which is substantially independent of the transmission medium.

The output of the low-pass filter 1 is sampled by means of an analog-to-digital converter 2 with a sampling period T and converted into a digital signal. This is done to enable a further digital processing of the received signal. Since only discrete-time signals occur in the receiver subsequent to the sampling by the analog-to-digital converter 2, the signals in the receiver are expressed as a function of the rank number k of the sample considered, as is customary in the technique of discrete-time signal processing.

The output signal of the analog-to-digital converter 2 is filtered by high-pass filter 3. The high-pass filter 3 affects the leading edge of the received data symbols so that there is a zero crossing at an instant T before the maximum of the relevant data symbol occurs. This zero crossing is used for determining the phase difference between the locally generated Baud rate clock signal and the Baud rate clock signal associated with the received data symbols.

The echo canceller 4 has for its task to cancel the echos which occur because in full-duplex data transmission over a single pair of wires the symbols transmitted by a station cause crosstalk to the input of the receiver belonging to that station. To enable this cancellation, the data symbols z transmitted are to be applied to the symbol input of the echo canceller 4.

The decision feedback intersymbol interference canceller 5 removes the postcursive intersymbol interference so that the signal s(k) is virtually free from echos and intersymbol interference and can be applied to the symbol detector 6.

The symbol detector 6 compares the input signal to a reference voltage $V_r(k)$, and from this comparison determines the received symbol logic value C(k).

In order to enable operation of the receiver, various auxiliary signals are necessary. A first auxiliary signal is the reference voltage $V_r(k)$ which is necessary for enabling a decision of the symbol detector with respect to the received signal. The optimum value of $V_r(k)$ is proportional to the amplitude of the received data symbols.

A second auxiliary signal is a Baud rate clock signal. The frequency and phase of this Baud rate clock signal are to be substantially equal to the phase and frequency of the Baud rate clock signal associated to the received data symbols.

Since both auxiliary signals are to be adapted to the received signal, these signals are derived from this received signal. For this purpose an error signal e(k), which is a measure of the difference between the value of the signal s(k) at a sampling instant and an estimate of such value, is determined by means of the arithmetic circuit 7.

From error signal e(k) information may be obtained on the difference between the present value of the $V_r(k)$ and the optimum value of $V_r(k)$. Reference circuit 8 determines this difference and adapts $V_r(k)$ with the aid of this difference. The generation of an adaptive reference voltage $V_r(k)$ is known from the article entitled "Adaptive Reference Echo Cancellation" by D. D. Falconer in IEEE Transactions On Communications, Vol. COM-30, No. 9, September 1982, pp. 2083-2094.

The error signal e(k) may also be used to adapt adaptive means which may be available in the echo canceller 4 and decision feedback intersymbol interference canceller 5. The structure and the operation of the adaptive echo cancellers and decision feedback intersymbol interference cancellers are widely known.

The phase difference between the Baud rate clock signal and the Baud rate clock signal associated with the data symbols can be determined from the signal e(k). As a result of the zero crossing of the signal s(k), which occurs at an instant T before the maximum of a data symbol, the signal e(k−1)*sign[C(k)] is a measure of the clock phase difference. The synchronizing method which is based on this signal is termed the precursor synchronizing method. The precursor synchronizing method is further discussed in the above identified Dutch Patent Application no. 8800490. The local Baud rate clock signal is generated by means of the timing circuit 9.

Figure 2:
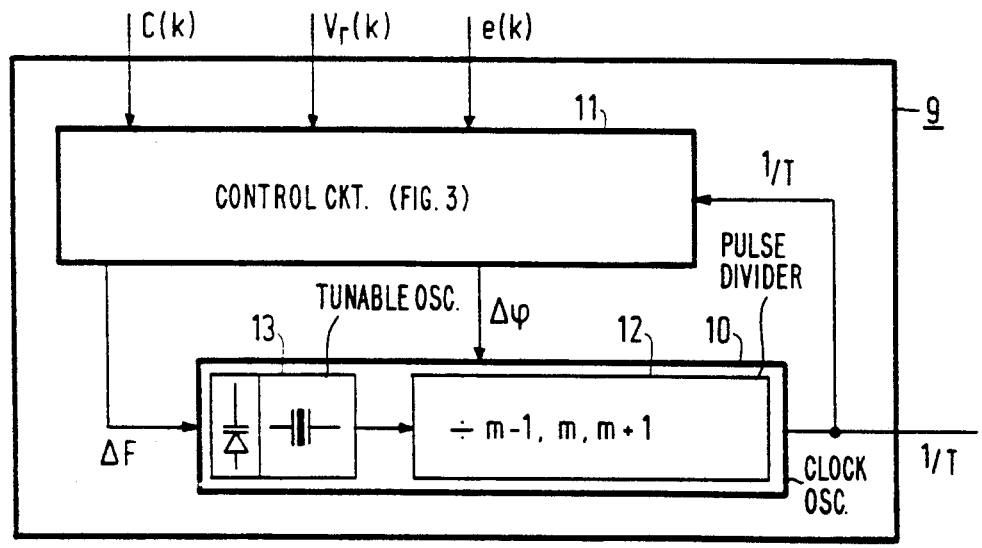
FIG. 2 shows a block diagram of an embodiment of a timing circuit for the receiver as shown in FIG. 1.

In FIG. 2, the signals C(k), V$_r$(k) and e(k) are applied to inputs of a control circuit 11. Control circuit 11 produces an output frequency control signal ΔF and an output phase control signal Δϕ. These two control signals are applied to inputs of a controllable clock oscillator 10 which comprises a tunable crystal oscillator 13 and a programmable pulse divider 12. The output of the controllable clock oscillator, which is an output Baud rate clock signal having a frequency 1/T, is connected to the clock input of the control circuit 11.

The operation of the timing circuit 9 will now be further explained. The clock oscillator 10 is controlled by the control signals Δϕ and ΔF applied thereto, which each may assume the logic values −1, 0 or +1.

The phase of the generated Baud rate clock signal is influenced by the signal Δϕ. If the logic value of the signal Δϕ is +1 during a symbol interval, the dividend of the programmable pulse divider 12 will be equal to m−1 in lieu of m during this symbol interval. This causes the generated Baud rate clock pulse to be slightly shorter and a positive phase step will occur. If the logic value of the signal Δϕ is equal to −1 during a symbol interval, the dividend of the programmable divider 12 will be equal to m+1 in lieu of m during that symbol interval, so that the generated Baud rate pulse will be slightly longer and a negative phase step will occur. If the logic value of the signal Δϕ is equal to 0, the dividend of the programmable divider 12 will remain equal to the nominal value m and no phase step will be made.

The frequency of the crystal oscillator and hence also the frequency of the generated Baud rate clock signal is influenced by the control signal ΔF. If the logic value of ΔF is equal to +1, the frequency of the crystal oscillator will constantly be increased in small steps. If the logic value of ΔF is equal to −1, the frequency of the crystal oscillator will constantly be reduced in small steps. If the logic value of ΔF is equal to zero, the frequency of the crystal oscillator will not be changed.

Figure 3:
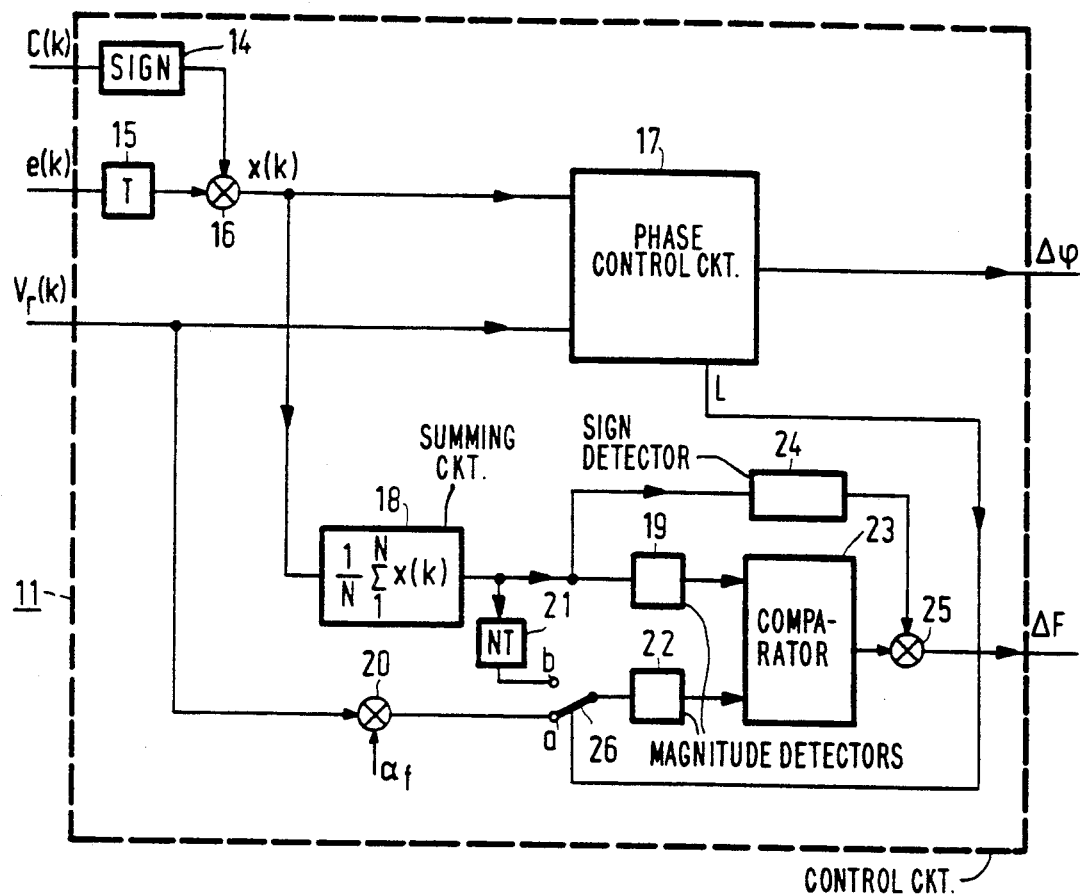
FIG. 3 shows a block diagram of an embodiment of the control circuit for the clock oscillator of the timing circuit according to the invention.

The control circuit 11 is shown in FIG. 3, wherein the output signal logic value signal C(k) is applied to sign determining circuit 14. The error signal e(k) is applied to a delay element 15. The output signals of the sign determining circuit 14 and the delay element 15 are applied to the inputs of a multiplier 16. The output of the multiplier 16 is an output signal x(k) which is connected to the signal input of a phase control circuit 17. The signal V$_r$(k) is also applied to the phase control circuit 17. The desired phase control signal Δϕ is available at the output of the phase control circuit, which also has an output L.

The output signal x(k) of the multiplier 16 is also applied to the input of a summing circuit 18. The output of circuit 18 is connected to the input of a delay element 21, the input of a sign determining circuit 24 and the input of a signal magnitude detecting circuit 19. The output of the delay element 21 is connected to a contact (b) of a change-over switch 26. The signal V$_r$(k) is applied to a multiplier 20. The output of this multiplier is connected to a contact (a) of the change-over switch 26. The central contact of the change-over switch 26 is connected to another signal magnitude detecting circuit 22.

The outputs of the signal magnitude detecting circuits 19 and 22 are connected to a comparator circuit 23. The output of the comparator circuit 23 and output of the sign determining circuit 24 are connected to a multiplier circuit 25. At the output of multiplier 25 the frequency control signal ΔF is available. The change-over switch 26 assumes state (a) if the signal L is inactive and assumes state (b) if signal L is active.

The operation of the control circuit 11 will now be further explained. The sign determining circuit 14 determines the sign of the logic value signal C(k). The logic value of the output signal of the sign determining circuit 14 is equal to +1 if C(k) is positive, and equal to −1 if C(k) is negative. The delay element 15 delays the signal e(k) over a symbol period, so that e(k−1) is available at the output of the delay element 15. The multiplier 16 determines the product x(k)+e(k−1)*sign[c(k)] formed from the output signal of sign determining circuit 14 and the output signal of delay element 15. As already explained hereinbefore, this product is a measure of the clock phase difference.

A positive value of x(k) denotes that the locally generated Baud rate clock signal is lagging the Baud rate clock signal associated with the received data symbols. A negative value of x(k) denotes that the locally generated Baud rate clock signal is leading the Baud rate clock signal associated with the received data symbols.

The phase control circuit 17 determines the mean value of the signal x(k) over a number of symbol intervals, and compares this mean value to a predetermined fraction αF of the reference signal V$_r$(k). If the absolute mean value of x(k) is larger than the predetermined fraction αF of the signal V$_r$(k) and is positive, the logic value of the output signal Δϕ is made equal to +1 and so causes the clock oscillator to make a positive phase step. If the aforesaid mean value of x(k) is negative, the logic value of the output signal Δϕ is made equal to −1 and so causes the clock oscillator to make a negative phase step. If the absolute mean value of x(k) is smaller than the predetermined fraction ΔF of V$_r$(k), the logic value of Δϕ is made equal to 0. In that case no phase step is to be made by the clock oscillator.

Phase control circuit 17 has an output L which is activated when no phase correction is to take place over a predetermined number of symbol intervals. This will happen when the frequency and phase of the locally generated Baud rate clock signal are substantially equal to the frequency and phase of the Baud rate clock signal associated with the received data symbols.

Summator 18 produces an averaged error signal by averaging the output signal x(k) of multiplier 16 over N symbol intervals. This is advantageous in that the influence of occasional interference, such as noise, on the value of the error signal e(k) is reduced.

Let it be assumed that the change-over switch 26 is still in state (a) which will be the case if the clock phase difference is still considerable. The comparator circuit 23 will then compare the magnitude of the error signal to the magnitude of a predetermined fraction $\alpha_f$ of $V_r(k)$ which is determined by multiplier 20.

$V_r(k)$ is included in the comparison because the output signal of the comparator circuit 23 is to be independent of the amplitude of the received data signal. Since $V_r(k)$ is proportional to the amplitude of the received data signal, both input signals of the comparator circuit are proportional to the amplitude of the received data signal and so the decision of the comparator circuit 23 will be independent of the amplitude of the received data signal.

If the magnitude of the error signal is smaller than the given fraction $\alpha F$ of $V_r(k)$ (thus $|e(k)| < \alpha_p V_r(k)$), the logic value of the output signal of the comparator circuit 23 will be equal to 0 and so the logic value of the output signal $\Delta F$ of multiplier 25 is equal to 0. That signifies that the frequency of the clock oscillator must not be changed. If the magnitude of the error signal is larger than the predetermined fraction $\alpha_f$ of $V_r(k)$, the logic value of the output signal of the comparator circuit 23 will be equal to 1. If such larger error signal is also positive, the logic value of the output signal of the sign determining circuit 24 will be equal to +1 and thus the logic value of the output signal of the multiplier 25 will be equal to +1, causing the frequency of the clock oscillator to be increased. If such larger error signal is negative, the logic value of the output signal of the sign determining circuit 24 will be equal to −1 and thus the logic value of the output signal of the multiplier 25 will be equal causing −1, to the frequency of the clock oscillator to be reduced.

If phase control circuit 17 renders the signal L active, which will be when the phase and frequency of the clock oscillator are virtually correct, switch 26 will be changed to state (b). The comparator circuit 23 now receives at its error signals corresponding to two successive sample values. The delay element 21 is used for recollecting the error signal corresponding to the previous sample value.

If the error signal corresponding to the present sample value is larger than the error signal corresponding to the previous sample value, which will be the case if there is an augmenting magnitude of the clock phase difference, the logic value of the output signal of comparator circuit 23 will be equal to 1. The logic value of the output signal $\Delta F$ of multiplier 25 will then be equal to +1 if the present error signal is positive, and will be equal to −1 if the present error signal is negative. The frequency of the clock oscillator will then be correspondingly adapted. If the error signal for the present sample value is smaller than the error signal for the previous sample value, which will be the case if there is a decreasing magnitude of the clock phase difference, the output signal of comparator circuit 23 will be equal to 0 and so the output signal of the multiplier 25 will be equal to 0. Consequently, the frequency of the clock oscillator will not be adapted.

The method implemented for frequency control during the time the timing circuit is capturing corresponds to the algorithm heretofore used for phase control. The method implemented for frequency control after the timing circuit has captured is the method according to the invention. The switching between the two methods occurs because the method used while the timing circuit is capturing rapidly converges to the correct frequency value but causes frequency and phase oscillations, whereas the method according to the invention, which is used after the timing circuit has captured, shows a slower convergence, but strongly suppresses the frequency and phase oscillations. The lower convergence speed of the algorithm according to the invention is caused by the fact that there may be long intervals of time during which the frequency of the clock oscillator remains unchanged.

Figure 4:
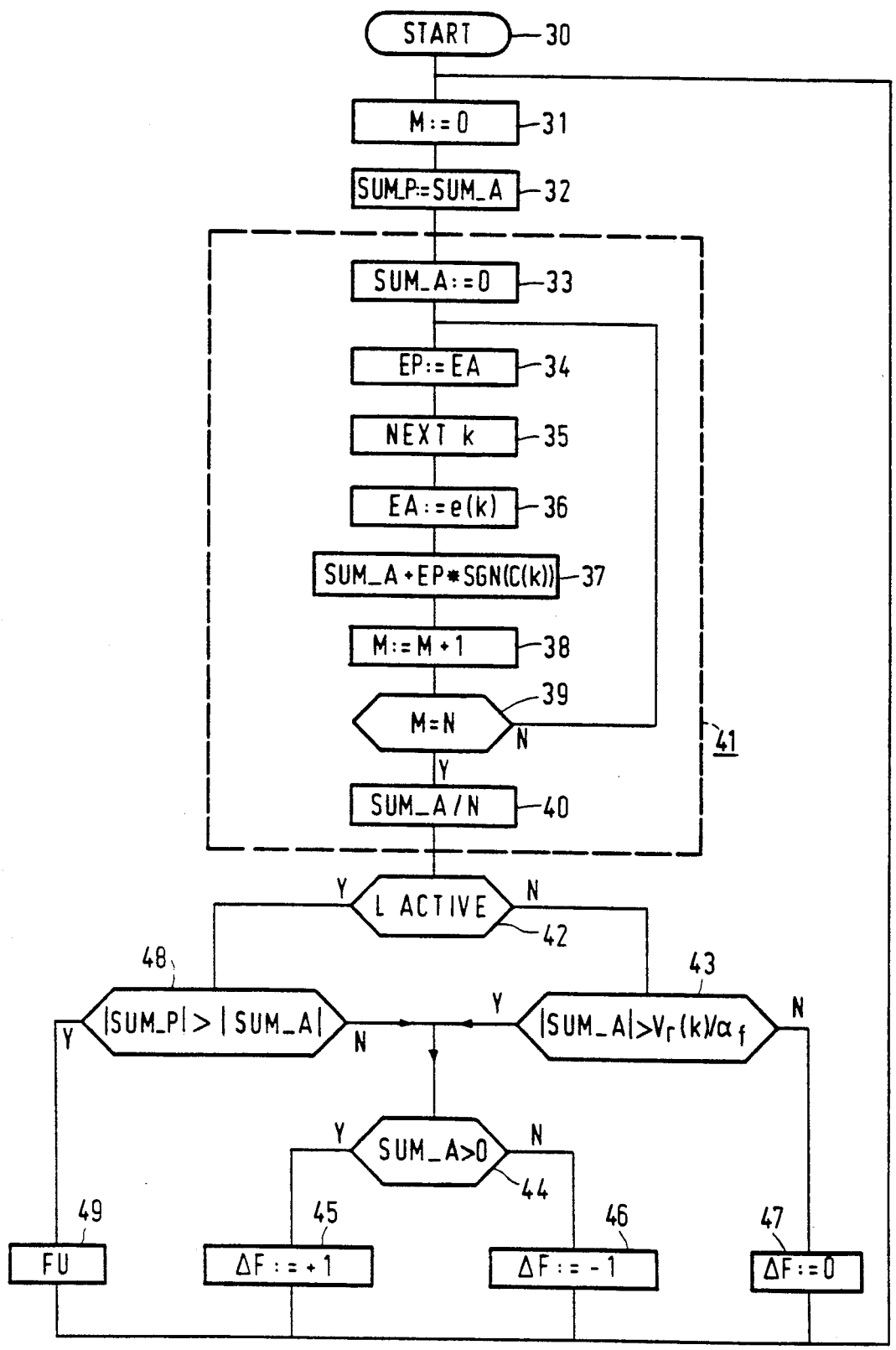
FIG. 4 shows a flow chart of a program intended for a programmable processor for controlling the frequency of the clock oscillator according to the invention.

A further possibility to realise frequency control of the clock oscillator is to use a programmable processor with a dedicated program by which the signals at the inputs of the processor can be read, processed and the desired output signals can be generated. FIG. 4 shows a flow chart of a programme of this type for providing processor operation functionally equivalent to the control circuit in FIG. 3. In FIG. 4 the numbered instructions have a connotation as represented in the Table below.

| NO. | INSCRIPTION | CONNOTATION |
|---|---|---|
| 30 | START | Initialization, all variables used are set to zero. |
| 31 | M:=0 | Counter M is set to zero. |
| 32 | SUM_P:=SUM_A | Variable SUM_P is made equal to variable SUM_A. |
| 33 | SUM_A:=0 | Variable SUM_A is set to zero. |
| 34 | EP:=EA | Variable EP is made equal to variable EA. |
| 35 | NEXT k | Wait for next received data symbol. |
| 36 | EA:=e(k) | Make variable EA equal to the signal e(k). |
| 37 | SUM_A+EP*sign[C(k)] | The new value of SUM_A is formed by adding the product of EP and the sign of C(k) to the previous value of SUM_A. |
| 38 | M:=M+1 | Counter M is incremented by 1. |
| 39 | M=N | M is compared to N. |
| 40 | SUM_A/N | The new value of SUM_A is obtained by dividing the previous value of SUM_A by N. |
| 41 | | In this block the mean value over N symbols of e(k-1)*sign[C(k)] is calculated. |
| 42 | L ACTIVE | It is verified whether the signal L is active. |
| 43 | $|SUM\_P| > V_r(k)/\alpha_f$ | The absolute value of SUM_P is compared to the fraction $\alpha_f$ of $V_r(k)$. |
| 44 | SUM_A>0 | SUM_A is compared to 0. |
| 45 | $\Delta F:=+1$ | Output $\Delta F$ is made equal to +1. |
| 46 | $\Delta F:=-1$ | Output $\Delta F$ is made equal to −1. |
| 47 | $\Delta F:=0$ | Output $\Delta F$ is made equal to 0. |
| 48 | $|SUM\_P| > |SUM\_A|$ | The absolute value of SUM_A is compared to the absolute value of SUM_P. |
| 49 | FU | Subroutine for frequency adaptation of the clock oscillator with a decreasing absolute value of SUM_A. |

Figure 5:
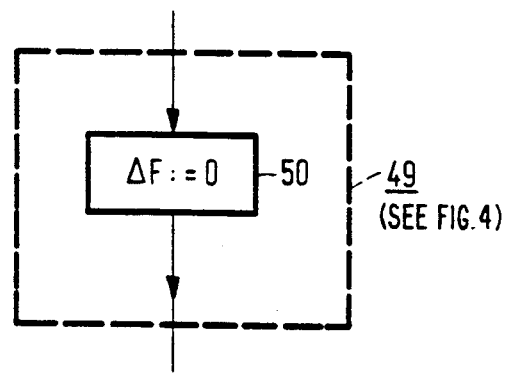
FIG. 5 shows a flow chart of a first embodiment for a subroutine according to the invention to be incorporated in the program for controlling the frequency of the clock oscillator.

FIG. 5 shows a flow chart of a first embodiment of the subroutine of block 49 according to the invention. In FIG. 5 the instruction 50 has the connotation:

| NO. | INSCRIPTION | CONNOTATION |
| --- | --- | --- |
| 50 | ΔF:=0 | Output ΔF is made equal to 0. |

Figure 6:
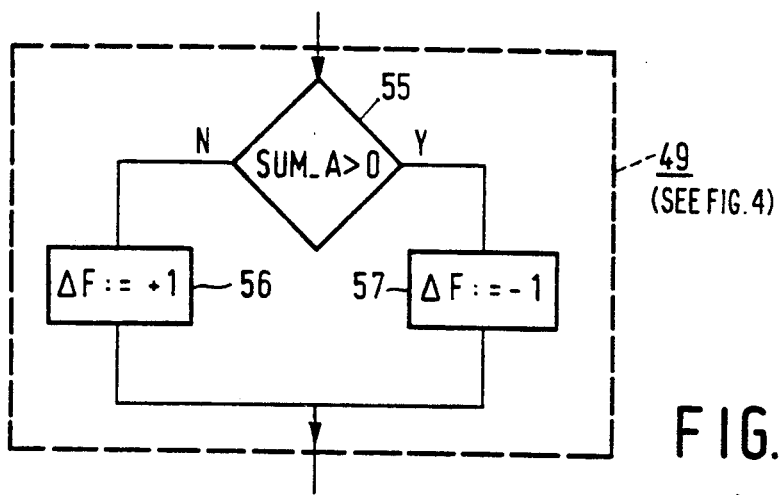
FIG. 6 shows a flow chart of a second embodiment for a subroutine according to the invention to be incorporated in the program for controlling the frequency of the clock oscillator.

FIG. 6 shows a flow chart of a second embodiment of the subroutine of block 49 according to the invention. In FIG. 6 the numbered instructions have the connotations as indicated in the Table below.

| NO. | INSCRIPTION | CONNOTATION |
| --- | --- | --- |
| 55 | SUM_A>0 | SUM_A is compared to 0. |
| 56 | ΔF:=−1 | Output ΔF is made equal to −1. |
| 57 | ΔF:=+1 | Output ΔF is made equal to +1. |

Figure 7:
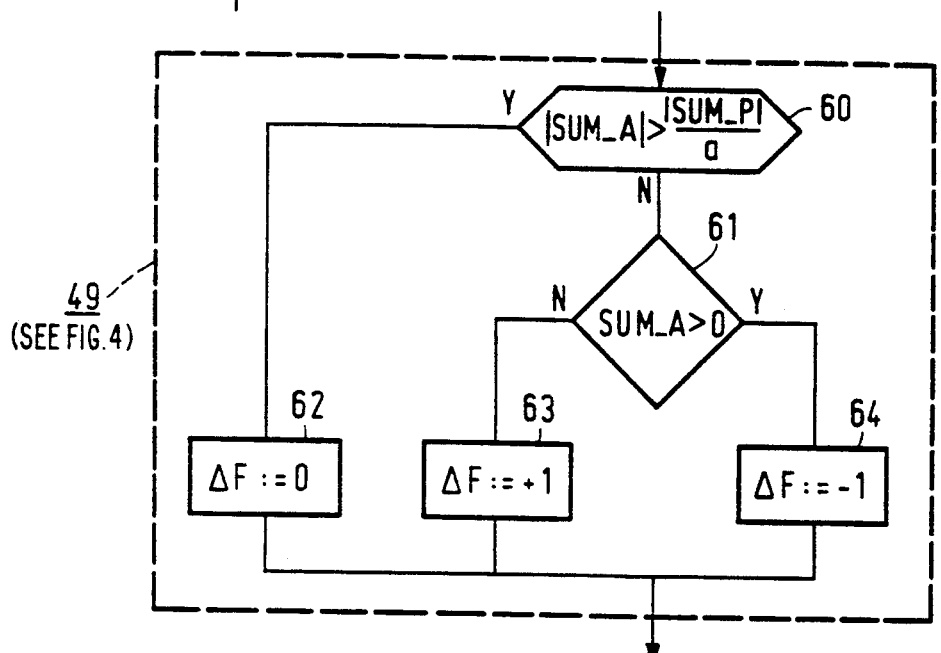
FIG. 7 shows a flow chart of a third embodiment for a subroutine according to the invention to be incorporated in the program for controlling the frequency of the clock oscillator.

FIG. 7 shows a flow chart of a third embodiment of the subroutine of block 49 according to the invention. In FIG. 7 the numbered instructions have the connotations as indicated in the Table below.

| NO. | INSCRIPTION | CONNOTATION |
| --- | --- | --- |
| 60 | \|SUM_A\|>\|SUM_P\|/a | Compare the absolute value of SUM_A to a fraction of the absolute value of SUM_P. |
| 61 | SUM_A>0 | Compare SUM_A to 0. |
| 62 | ΔF:=0 | Make output ΔF equal to 0. |
| 63 | ΔF:=−1 | Make output ΔF equal to −1. |
| 64 | ΔF:=+1 | Make output ΔF equal to +1. |

The operation of the program according to FIG. 4 will now be explained in detail. When the receiver is switched on, instruction 30 is started with which provides that all variables used are set to 0 in order to obtain a well-defined starting position. Instruction 31 sets a counter M to 0. Counter M shows the number of times a partial sum SUM_A has already been calculated. Thereupon, in instruction 32 the previous value of the error signal, which is a measure for the clock phase difference, is included in an auxiliary variable SUM_P.

Block 41 calculates the error signal which is equal to the mean value of $e(k-1)*sign[C(k)]$ over N symbol intervals. Block 41 commences with instruction 33 in which the partial sum SUM_A is made equal to 0. Then, in instruction 34, the signal value $e(k-1)$ included in the variable EA is transferred to variable EP. Thereafter, in instruction 35, the next data symbol is waited for. If the next data symbol is available, in instruction 36 the variable EA will be made equal to the value of the signal $e(k)$. In instruction 37, the product of variable EP and the result of sign $[c(k)]$ is added to the partial sum SUM_A. Consequently, SUM_A is incremented by $e(k-1)*sign[C(k)]$. In instruction 38 the counter M is incremented by 1. Thereupon, in instruction 39, the count of counter M is compared to the value N. If M is still smaller than N, instruction 34 will be returned to for an estimate of the next partial sum. If M is equal to N, the complete sum has been determined and, in instruction 40, SUM_A will be divided by N so that after instruction 40 the error signal is available in SUM_A.

In instruction 42 it is then determined whether the signal L, originating from the phase control circuit is active as a sign that the clock phase difference is relatively small. If signal L is not active, instruction 43 will be proceeded to where the absolute value of the error signal is compared to a fraction $\alpha_f$ of the signal $V_f(k)$. If the absolute value of the error signal is smaller than the fraction $\alpha_f$ of the signal $V_f(k)$, instruction 47 will be proceeded to which makes the output signal ΔF equal to zero to retain a constant frequency of the clock oscillator. If the absolute value of the error signal is larger than the fraction $\alpha_f$ of the signal $V_f(k)$, instruction 44 will be proceeded to where the error signal is compared to 0. If the error signal is positive, the logic value of output ΔF will be made equal to +1 in instruction 45. If the error signal is negative, the logic value of the output ΔF will be made equal to −1 in instruction 46. After the instructions 45, 46 or 47 have been carried out, instruction 31 will be returned to where the calculation of the new error signal is commenced.

If, at any moment, signal L becomes active, the next time instruction 42 will be carried out, instruction 48 will be proceeded to. In instruction 48 two successive absolute values of the error signal contained in the variables SUM_P and SUM_A are compared. If the absolute value of the present error signal is larger than the absolute value of the previous error signal, instruction 44 will be proceeded to which provides a frequency adaptation as explained hereinbefore. However, if the absolute value of the present error signal is smaller than the absolute value of the previous error signal, this implies that the absolute value of the error signal is decreasing so that block 49 according to the invention will be carried out before instruction 31, is returned to.

The operation of a first embodiment of the subroutine according to block 49 will be further explained with reference to FIG. 5. In this embodiment it is assumed that no frequency correction is necessary if the absolute value of the error signal is decreasing. Therefore, in instruction 50, the logic value of the output ΔF is set to zero so that the frequency of the clock oscillator is maintained constant.

The operation of a second embodiment of the subroutine according to block 49 will be further explained with reference to FIG. 6. In this embodiment, if the absolute value of the error signal is decreasing, one wishes to slow down this decrease by reducing the absolute value of the frequency difference between the locally generated clock signal and the clock signal associated to the received data symbols. For this purpose, the error signal is compared to 0 in instruction 55. If the error signal is negative, instruction 56 will be carried out as a result of which the logic value of the output ΔF will be made equal to +1, which entails a frequency increase. If the error signal is positive, instruction 57 will be carried out as a result of which the logic value of the output ΔF will be made equal to −1, which entails a frequency decrease.

The operation of the third embodiment of the subroutine according to block 49 will be further explained with reference to FIG. 7. In this embodiment one wishes to slow down the reduction of the absolute value of the error signal only if this reduction is greater than a predetermined value. For this purpose, the absolute value of the present error signal is compared in instruction 60 to a fraction a of the absolute value of the previous error signal. If the present absolute value is larger than the fraction a of the previous error signal, the reduction will be relatively small. In that case instruction 62 will be proceeded to where the logic value of the output ΔF is made equal to 0 to maintain the frequency of the clock oscillator at a constant level. If the present absolute value is smaller than the fraction a of the previous error signal, the reduction will be relatively large so that this reduction will have to be slowed down. In that case instruction 61 will be proceeded to where the error signal is compared to 0. If the error signal is negative, instruction 63 will be carried out as a result of which the logic value of the output ΔF will be made equal to +1, which entails a frequency increase. If the error signal is positive, instruction 64 will be carried out as a result of which the logic value of the output ΔF will be made equal to −1, which entails a frequency reduction.

Figure 8:
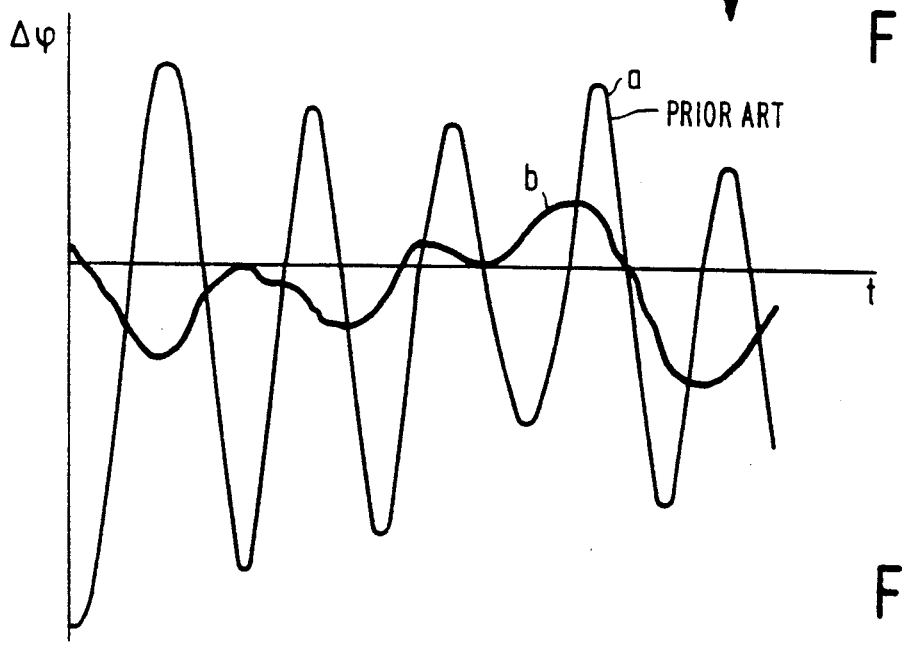
FIG. 8 shows graphs of the clock phase difference $\Delta \phi$ plotted against time, both for a prior-art receiver and for a receiver according to the invention, in which the first embodiment for the subroutine for the frequency control of the Baud rate clock oscillator is used.

In FIG. 8, curve (a) shows the clock phase difference in the prior-art receiver plotted against time. In this curve the virtually sine-shaped phase oscillation is distinctly visible. In curve (b) the phase error in the receiver according to the invention, this sine-shaped oscillation has substantially disappeared. The remaining phase error in curve (b) is caused by echos and inter-symbol interference.

I claim:

1. A receiver for recovering from a received data signal data symbols included therein having a Baud rate in accordance with a symbol Baud rate clock signal; said receiver comprising: a local oscillator for generating a local Baud rate clock signal, means for sampling the received data signal in accordance with the local Baud rate clock signal, and means for producing from each signal sample an error signal indicative of a phase difference between the local Baud rate clock signal and the symbol Baud rate clock signal; characterized in that said receiver further comprises:

means for determining the magnitude and the sign of said error signal for each signal sample;

comparator means adapted to compare, for a present signal sample, the magnitude of the error signal for such signal sample with the magnitude of the error signal for the immediately preceding signal sample and to produce a logic signal based on such comparison, said logic signal having a first logic value when the magnitude of the error signal for the present signal sample is less than the magnitude of the error signal for the immediately preceding signal sample, and having a second logic value when the magnitude of the error signal for the present signal sample is greater than the magnitude of the error signal for the immediately preceding signal sample; and means for combining said logic signal with the sign of the error signal for the present signal sample so as to derive a control signal for said local oscillator, said control signal adjusting the frequency of the local clock signal so as to reduce the phase difference between the local clock signal and the symbol clock signal.

2. A receiver as claimed in claim 1, characterized in that said means for determining the magnitude and the sign of said error signal for a present signal sample determines the mean value of the error signal for such signal sample and the error signals for a number of preceding signal samples.

3. A receiver as claimed in claim 2, characterized in that said control signal does not alter the frequency of the local clock signal when the logic signal produced by said comparator means has said first logic value.

4. A receiver as claimed in claim 2, characterized in that said control signal (i) does not alter the frequency of the local clock signal when the logic signal produced by said comparator means has said first logic value and the local clock signal is phase lagging the symbol clock signal; and (ii) increases the frequency of the local clock signal when the logic signal produced by said comparator means has said first logic values and the local clock signal is phase leading the symbol clock signal.

5. A receiver as claimed in claim 2, characterized in that said control signal (i) does not alter the frequency of the local clock signal when the logic signal produced by said comparator means has said first logic value and the magnitude of the error signal for the present signal sample exceeds a predetermined fraction of the magnitude of the error signal for the immediately preceding signal sample; and (ii) reduces the frequency of the local clock signal when the logic signal produced by said comparator means has said first logic value and the magnitude of the error signal for the present signal sample is less than said predetermined fraction of the magnitude of the error signal for the immediately preceding signal sample, and also the local clock signal is phase lagging the symbol clock signal;

(iii) increases the frequency of the local clock signal when the difference signal produced by said comparator means is negative and the magnitude of the existing error signal exceeds a predetermined fraction of the magnitude of the immediately preceding error signal, and the local clock signal in phase leading the symbol clock signal.

6. A receiver as claimed in claim 2, characterized in that said control signal (i) increases the frequency of the local clock signal when the logic signal produced by said comparator means has said second logic value and the local clock signal is phase lagging the symbol clock signal, and also the magnitude of the error signal for the present signal sample exceeds a predetermined value; and (ii) reduces the frequency of the local clock signal when the logic signal produced by said comparator means has said second logic value and the local clock signal is phase leading the symbol clock signal, and also the magnitude of the error signal for the present signal sample exceeds said predetermined value; and (iii) does not alter the frequency of the local clock signal when the sign of the error signal for the present sample value is positive but the magnitude thereof is less than said predetermined value.

7. A receiver as claimed in claim 1, characterized in that said control signal does not alter the frequency of the local clock signal when the logic signal produced by said comparator means has said first logic value.

8. A receiver as claimed in claim 1, characterized in that said control signal (i) does not alter the frequency of the local clock signal when the logic signal produced by said comparator means has said first logic value and the local clock signal is phase lagging the symbol clock signal; and (ii) increases the frequency of the local clock signal when the logic signal produced by said comparator means has said first logic value and the local clock signal is phase leading the symbol clock signal.

9. A receiver as claimed in claim 8, characterized in that said control signal
   (i) increases the frequency of the local clock signal when the logic signal produced by said comparator means has said second logic value and the local clock signal is phase lagging the symbol clock signal, and also the magnitude of the error signal for the present signal sample exceeds a predetermined value; and
   (ii) reduces the frequency of the local clock signal when the logic signal produced by said comparator means has said second logic value and the local clock signal is phase leading the symbol clock signal, and also the magnitude of the error signal for the present signal sample exceeds said predetermined value; and
   (iii) does not alter the frequency of the local clock signal when the sign of the error signal for the present sample value is positive but the magnitude thereof is less than said predetermined value.

10. A receiver as claimed in claim 1, characterized in that said control signal
   (i) does not alter the frequency of the local clock signal when the logic signal produced by said comparator means has said first logic value and the magnitude of the error signal for the present signal sample exceeds a predetermined fraction of the magnitude of the error signal for the immediately preceding signal sample; and
   (ii) reduces the frequency of the local clock signal when the logic signal produced by said comparator means has said first logic value and the magnitude of the error signal for the present signal sample is less than said predetermined fraction of the magnitude of the error signal for the immediately preceding signal sample, and also the local clock signal is phase lagging the symbol clock signal;
   (iii) increases the frequency of the local clock signal if the logic signal produced by said comparator means has said first logic value and the magnitude of the error signal for the present signal sample is larger than said predetermined fraction of the magnitude of error signal for the immediately preceding signal sample, and the local clock signal is phase leading the symbol clock signal.

11. A receiver as claimed in claim 1, characterized in that said control signal
   (i) increases the frequency of the local clock signal when the logic signal produced by said comparator means has said second logic value and the local clock signal is phase lagging the symbol clock signal, and also the magnitude of the error signal for the present signal sample exceeds a predetermined value; and
   (ii) reduces the frequency of the local clock signal when the logic signal produced by said comparator means has said second logic value and the local clock signal is phase leading the symbol clock signal, and also the magnitude of the error signal for the present signal sample exceeds said predetermined value; and
   (iii) does not alter the frequency of the local clock signal when the sign of the error signal for the present sample value is positive but the magnitude thereof is less than said predetermined value.

* * * * *